United States Patent
Chai et al.

(10) Patent No.: US 11,270,166 B2
(45) Date of Patent: Mar. 8, 2022

(54) IMAGE IDENTIFICATION SYSTEM AND IMAGE IDENTIFICATION METHOD

(71) Applicant: CloudMinds (Shanghai) Robotics Co., Ltd., Shanghai (CN)

(72) Inventors: Lunshao Chai, Beijing (CN); Shiguo Lian, Beijing (CN)

(73) Assignee: CLOUDMINDS (SHENZHEN) ROBOTICS SYSTEMS CO., LTD, Guangdong (CN)

( * ) Notice: Subject to any disclaimer, the term of this patent is extended or adjusted under 35 U.S.C. 154(b) by 221 days.

(21) Appl. No.: 16/454,488

(22) Filed: Jun. 27, 2019

(65) Prior Publication Data

US 2019/0318208 A1    Oct. 17, 2019

Related U.S. Application Data

(63) Continuation of application No. PCT/CN2016/112432, filed on Dec. 27, 2016.

(51) Int. Cl.
*G06K 9/62* (2006.01)

(52) U.S. Cl.
CPC ......... *G06K 9/6267* (2013.01); *G06K 9/6256* (2013.01)

(58) Field of Classification Search
CPC .......................... G06K 9/6267; G06K 9/6256
See application file for complete search history.

(56) References Cited

U.S. PATENT DOCUMENTS 6,501,855 B1    12/2002  Parascript
7,546,293 B2 *   6/2009  Zhang .................. G06K 9/6215
(Continued)

FOREIGN PATENT DOCUMENTS

CN    101299762 A    11/2008
CN    103324937 A     9/2013
(Continued)

OTHER PUBLICATIONS

Multi-label chest X-ray image classification—learning, Qingji Guan et al., ELSEVIER, 0167-8655, 2018, pp. 259-266 (Year: 2018).*
(Continued)

*Primary Examiner* — Jayesh A Patel
(74) *Attorney, Agent, or Firm* — Eschweiler & Potashnik, LLC (57) ABSTRACT

The embodiment of the present disclosure provides an image identification system and an image identification method, and relates to the field of identification technology for improving the classification accuracy of the existing image classification model. The system includes an identification module, a retrieval module and a training module, wherein the identification module is configured to identify an image sample by using an image classification model to obtain an image category confidence coefficient of the image sample; the retrieval module is configured to retrieve similar artificial identification examples of the image sample when it is determined that the image category confidence coefficient is less than a first predetermined threshold; and the training module is configured to train the image classification model according to training samples in a training sample library; wherein the training samples include an artificial identification example and an image retrieval example with a high confidence coefficient.

7 Claims, 5 Drawing Sheets

(56) References Cited

U.S. PATENT DOCUMENTS

| | | | | |
|---|---|---|---|---|
| 7,711,747 | B2* | 5/2010 | Renders | G06F 16/355 707/771 |
| 7,720,848 | B2* | 5/2010 | Guerraz | G06F 16/35 707/737 |
| 8,165,974 | B2* | 4/2012 | Privault | G06Q 50/18 706/12 |
| 8,429,173 | B1* | 4/2013 | Rosenberg | G06F 16/14 707/748 |
| 9,053,358 | B2* | 6/2015 | Yokono | G06K 9/00389 |
| 9,602,685 | B2* | 3/2017 | Miyauchi | H04N 1/3878 |
| 10,102,418 | B2* | 10/2018 | Bredno | G06T 7/0012 |
| 10,482,313 | B2* | 11/2019 | Murthy | G06K 9/4628 |
| 2003/0128877 | A1* | 7/2003 | Nicponski | G06K 9/6269 382/224 |
| 2005/0185845 | A1* | 8/2005 | Luo | G06K 9/6292 382/224 |
| 2006/0136410 | A1* | 6/2006 | Gaussier | G06K 9/623 |
| 2007/0005356 | A1* | 1/2007 | Perronnin | G06K 9/4676 704/245 |
| 2008/0294514 | A1* | 11/2008 | Caiman | G06Q 30/0269 705/14.66 |
| 2009/0144033 | A1* | 6/2009 | Liu | G06K 9/6226 703/2 |
| 2011/0040711 | A1* | 2/2011 | Perronnin | G06N 20/10 706/12 |
| 2011/0211772 | A1* | 9/2011 | Haseyama | G06F 16/58 382/305 |
| 2012/0020514 | A1* | 1/2012 | Sawai | G06K 9/6257 382/103 |
| 2012/0054658 | A1* | 3/2012 | Chuat | G06F 16/583 715/771 |
| 2012/0246099 | A1* | 9/2012 | Kawahara | G06K 9/6269 706/12 |
| 2013/0346431 | A1* | 12/2013 | Erol | G06K 9/036 707/758 |
| 2014/0161364 | A1* | 6/2014 | Sawai | G06K 9/6267 382/228 |
| 2014/0247972 | A1* | 9/2014 | Wang | G06K 9/00147 382/133 |
| 2014/0247978 | A1* | 9/2014 | Devin | G06K 9/6262 382/159 |
| 2016/0124996 | A1* | 5/2016 | Datta | G06F 16/532 382/155 |
| 2016/0259980 | A1* | 9/2016 | Mlybari | G06T 7/277 |
| 2016/0335478 | A1* | 11/2016 | Bredno | G06T 7/74 |
| 2017/0046565 | A1* | 2/2017 | Gilley | G06K 9/00288 |
| 2017/0082555 | A1* | 3/2017 | He | G01N 21/8851 |
| 2017/0109680 | A1* | 4/2017 | Apte | G06Q 10/06393 |
| 2017/0147900 | A1* | 5/2017 | Booth | G06T 7/11 |
| 2017/0262478 | A1* | 9/2017 | Zepeda Salvatierra | G06F 16/56 |
| 2018/0075599 | A1* | 3/2018 | Tajbakhsh | G06T 1/0007 |
| 2018/0121764 | A1* | 5/2018 | Zha | G06K 9/6267 |
| 2018/0247107 | A1* | 8/2018 | Murthy | G06K 9/4628 |
| 2018/0293729 | A1* | 10/2018 | Hashimoto | G06T 7/0012 |
| 2020/0126205 | A1* | 4/2020 | Liu | G06K 9/6256 |

FOREIGN PATENT DOCUMENTS

| | | |
|---|---|---|
| CN | 103425693 A | 12/2013 |
| CN | 104318242 A | 1/2015 |
| CN | 105844287 A | 8/2016 |
| JP | 2001319232 A * | 11/2001 |

OTHER PUBLICATIONS

Automatic medical image—feedback, Byoung Chui Ko et al., Springer, 10.1007/s10278-011-9443-5, 2011, pp. 454-465 (Year: 2011).*

Pavan Kumar Mallapragada et al.; SemiBoost: Boosting for Semi-supervised learning, «IEEE Transactions on Pattern Analysis and Machine Intelligence», Part B of Section III and Part A of Section IV, Nov. 30, 2009.

* cited by examiner

IMAGE IDENTIFICATION SYSTEM AND IMAGE IDENTIFICATION METHOD

CROSS-REFERENCE TO RELATED APPLICATION

The present application is a continuation application under 35 U.S.C. § 120 of PCT application No. PCT/CN2016/112432 filed on Dec. 27, 2016, the contents of which are incorporated herein by reference.

FIELD

The present disclosure relates to the field of identification technology, and in particular to an image identification system and an image identification method.

BACKGROUND

Artificial intelligence (referred to as AI) is also called machine intelligence, which refers to intelligence expressed by a system that is artificially manufactured. A machine learning algorithm is an important way to obtain the artificial intelligence. The machine learning algorithm learns a specific model by analyzing the existing data, and then makes judgment and prediction on actual scenes. For example, taking image identification as an example, in the prior art, classified training may be performed on training samples with known image categories through the machine learning algorithm (such as an SVM classification algorithm, a deep convolutional network algorithm and the like) to train an image classification model dedicated for image identification.

The classification accuracy of the existing image classification model depends on the number and quality of training samples. However, in practical application, it is often difficult and costly to obtain a sufficient number of training samples with high-quality.

SUMMARY

Embodiments of the present disclosure provide an image identification system and an image identification method for improving classification accuracy of an existing image classification model.

In order to achieve the above object, the embodiments of the present disclosure adopt the following technical solutions:

In a first aspect, an image identification system is provided, including:

an identification module, configured to identify an image sample by using an image classification model to obtain an image category confidence coefficient of the image sample;

a retrieval module, configured to retrieve similar artificial identification examples of the image sample when it is determined that the image category confidence coefficient obtained by the identification module is less than a first predetermined threshold, and use an identification result of a target artificial identification example having the highest confidence coefficient among the similar artificial identification examples as the identification result of the image sample; and a training module, configured to train the image classification model according to training samples in a training sample library; wherein the training samples include an artificial identification example and an image retrieval example with a high confidence coefficient; and the image retrieval example with the high confidence coefficient is used as the artificial identification example retrieved by the retrieval module.

In a second aspect, an image identification method is provided, including:

identifying an image sample by using an image classification model to obtain an image category confidence coefficient of the image sample; and retrieving similar artificial identification examples of the image sample when it is determined that the image category confidence coefficient is less than a first predetermined threshold, and using an identification result of a target artificial identification example having the highest confidence coefficient among the similar artificial identification examples as the identification result of the image sample.

According to the solution provided by the embodiments of the present disclosure, by importing the image retrieval technology on the existing image identification technology, when the image category confidence coefficient of the image sample identified on the basis of the image classification model is less than the predetermined threshold, the similar artificial identification examples are retrieved for the image sample by using the image retrieval technology, the identification result of the target artificial identification example having the highest confidence coefficient among the similar artificial identification examples is used as the identification result of the image sample, and the retrieved image sample with the high confidence coefficient is stored in the training sample library to serve as the training sample for subsequent re-training of the image classification model based on these training samples. In this way, high-quality samples are accumulated through image identification and image retrieval, and the image classification model is trained by image training, so that image identification, image retrieval and image training form a complete closed loop in the entire image identification system. With the continuous increase of the training samples and the continuous circulation of sample accumulation and re-training process, the identification ability of the image classification model and the identification accuracy of the identification module are iteratively improved.

BRIEF DESCRIPTION OF THE DRAWINGS

To illustrate technical solutions in the embodiment of the present disclosure or in the prior art more clearly, a brief introduction of the drawings which are needed in the description of the embodiments or the prior art is given below. Apparently, the drawings in the description below are merely some of the embodiments of the present disclosure, based on which other drawings may be obtained by those of ordinary skill in the art without any creative effort.

DETAILED DESCRIPTION

Some of the terms involved in the present application are explained below to facilitate the understanding of readers:

The term "and/or" in the present context is merely an association relationship describing associated objects and indicating the presence of three relationships, for example, A and/or B, which may indicate the following three conditions: A exists separately, A and B exist at the same time, and B exists separately. In addition, the character "/" in the present context generally indicates an "or" relationship between front and back associated objects. Unless otherwise stated, "a plurality of" in the present context refers to two or more.

It should be noted that, in the embodiment of the present disclosure, the words "exemplary" or "for example" or the like are used for meaning examples, example illustration or illustration. Any embodiment or design solution described as "exemplary" or "for example" in the embodiment of the present disclosure should not be construed as be more preferred or advantageous than other embodiments or design solutions. Properly speaking, the words "exemplary" or "for example" or the like are intended to present related concepts in a specific manner.

It should be noted that, in the embodiment of the present disclosure, the meaning of "a plurality of" refers to two or more unless otherwise stated.

It should be noted that, in the embodiment of the present disclosure, "of", "corresponding", "relevant" and "corresponding" may sometimes be mixed for use. It should be noted that, when the difference is not emphasized, the meanings to be expressed are the same.

The technical solutions provided by the embodiments of the present disclosure are described below in conjunction with the drawings of the embodiments of the present disclosure. Apparently, the embodiments described below are merely a part, but not all, of the embodiments of the present disclosure. It should be noted that some or all of the technical features in arbitrary multiple technical solutions provided below may be combined to form new technical solutions without conflict.

An executive body of an image identification method provided by the embodiment of the present disclosure may be an image identification system or an electronic device that may be used for executing the image identification method described above. The image identification system may be an electronic device integrated with an identification module, a retrieval module and a training module.

Exemplarily, the electronic device may be a personal computer (PC), a netbook, a personal digital assistant (referred to as PDA), a server or the like, which is capable of analyzing image samples by using the method provided by the embodiment of the present disclosure or performing model update on an image identification model (such as the image classification model mentioned in the embodiment of the present disclosure), or, the above electronic device may be a PC, a server and the like, which is installed with a software client or a software system or a software application and is capable of processing the image samples by using the method provided by the embodiment of the present disclosure, a specific hardware implementation environment may be a general computer form, or an ASIC way, or an FPGA, or some programmable expansion platforms such as Xtensa platform of Tensilica and the like. For example, the above electronic device may be integrated in a device or an instrument that needs to identify an front object such as an unmanned aerial vehicle, a blind navigator, an unmanned vehicle, an intelligent vehicle, a smart phone, etc.

The basic principle of the technical solution provided by the embodiment of the present disclosure is as follows: by importing the image retrieval technology, an identification method based on an image classification model is combined with a content-based image retrieval method, when an image category confidence coefficient of an image category identified by the image classification model is less than a predetermined threshold, similar artificial identification examples of the image sample are retrieved by the content-based image retrieval method for analysis to obtain an identification result of the image sample, and image retrieval samples with high confidence coefficients are stored in a training sample library as training samples to retrain the image classification model to improve the identification ability of the image classification model.

The image classification model in the present application is used for extracting image features of the image sample, and identifying the image category to which the image sample belongs according to the image features of an image sample and identifying the confidence coefficient of the image category of the image sample. For example, taking a deep convolutional network as an example, the deep convolutional network is a multilayer neural network, the last layer of the network is generally a fully connected layer, which may be regarded as a multi-classifier, correspondingly, the previous network layers may be regarded as feature extraction layers, and the features extracted by the deep convolutional network generally have high abstraction levels, contain more semantic information and have few image feature dimensions and a high retrieval speed.

Figure 1:
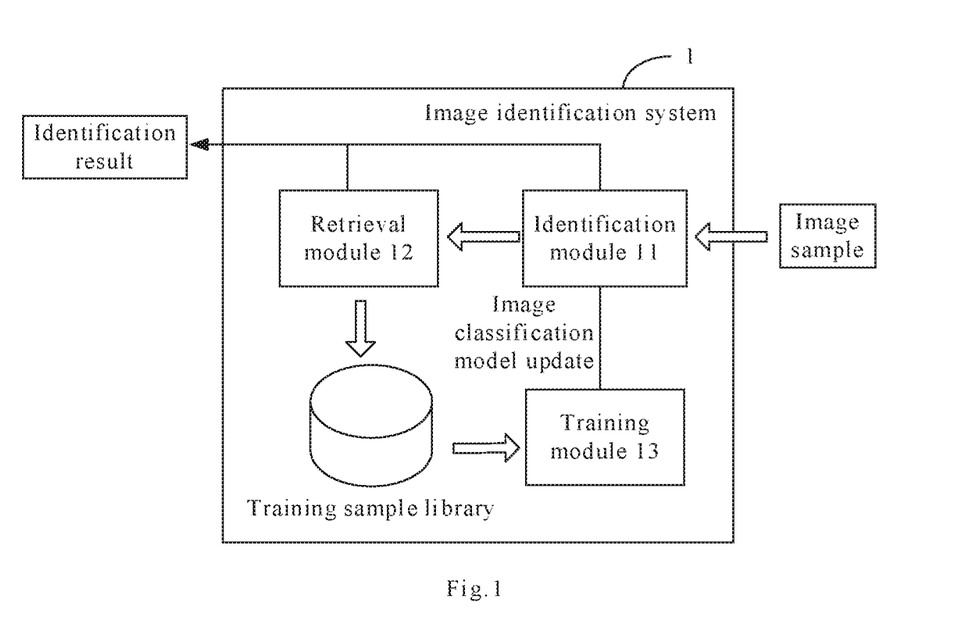
FIG. 1 is a system structure diagram of an image identification system provided by an embodiment of the present disclosure.

Based on the above contents, the embodiment of the present disclosure provides an image identification system 1, as shown in FIG. 1, the system includes an identification module 11, a retrieval module 12 and a training module 13, wherein:

the identification module 11 is configured to identify an image sample by using an image classification model to obtain an image category confidence coefficient of the image sample.

The image sample in the present application may be an image collected by a current user through an electronic device (for example, a camera, a mobile phone or the like) having an image collection function, and may also be an image collected by an own image collection module of the image identification module in real time.

The image identification system 1 in the present application may be applied to different application systems in different application scenarios, such as an assistant medical image diagnosis system, a navigation system, a blind assistant system, an intelligent assistant driving system, production line defective product detection system and other actual intelligent application systems. For example, when the image identification system in the present application is applied to the assistant medical image diagnosis system, the image sample is a medical image, and when the image identification system in the present application is applied to the navigation system or the blind assistant system, the image sample is a real-time image in front of the user collected in real time.

The image category confidence coefficient of the image sample in the present application is used for characterizing the accuracy of the identified image category.

The retrieval module 12 is configured to retrieve similar artificial identification examples of the image sample when it is determined that the image category confidence coefficient obtained by the identification module 11 is less than a first predetermined threshold, and use an identification result of a target artificial identification example having the highest confidence coefficient among the similar artificial identification examples as the identification result of the image sample.

The training module 13 is configured to train the image classification model within the identification module 11 according to training samples in a training sample library; wherein the training samples include an artificial identification example and an image retrieval example with a high confidence coefficient; and the image retrieval example with the high confidence coefficient is used as the artificial identification example retrieved by the retrieval module 12.

Optionally, the retrieval module 12 is further configured to store the image sample in the training sample library as the image retrieval example with the high confidence coefficient when the image category confidence coefficient of the image sample is greater than or equal to the first predetermined threshold.

Optionally, the above identification module 11 is further configured to:

output the identified identification result of the image sample when it is determined that the image category confidence coefficient of the image sample is greater than or equal to the first predetermined threshold.

Optionally, the above identification module 11 is further configured to obtain image features of the image sample.

The retrieval module 12 is specifically configured to:

retrieve the similar artificial identification examples of the image sample from the image sample library according to the image features of the image sample obtained by the identification module 11; wherein the similarity between the image features included in the identification results of the similar artificial identification examples and the image features of the image sample is greater than a second predetermined threshold.

The image sample library in the present application is used for storing one or more artificial identification examples with known identification results.

Figure 2:
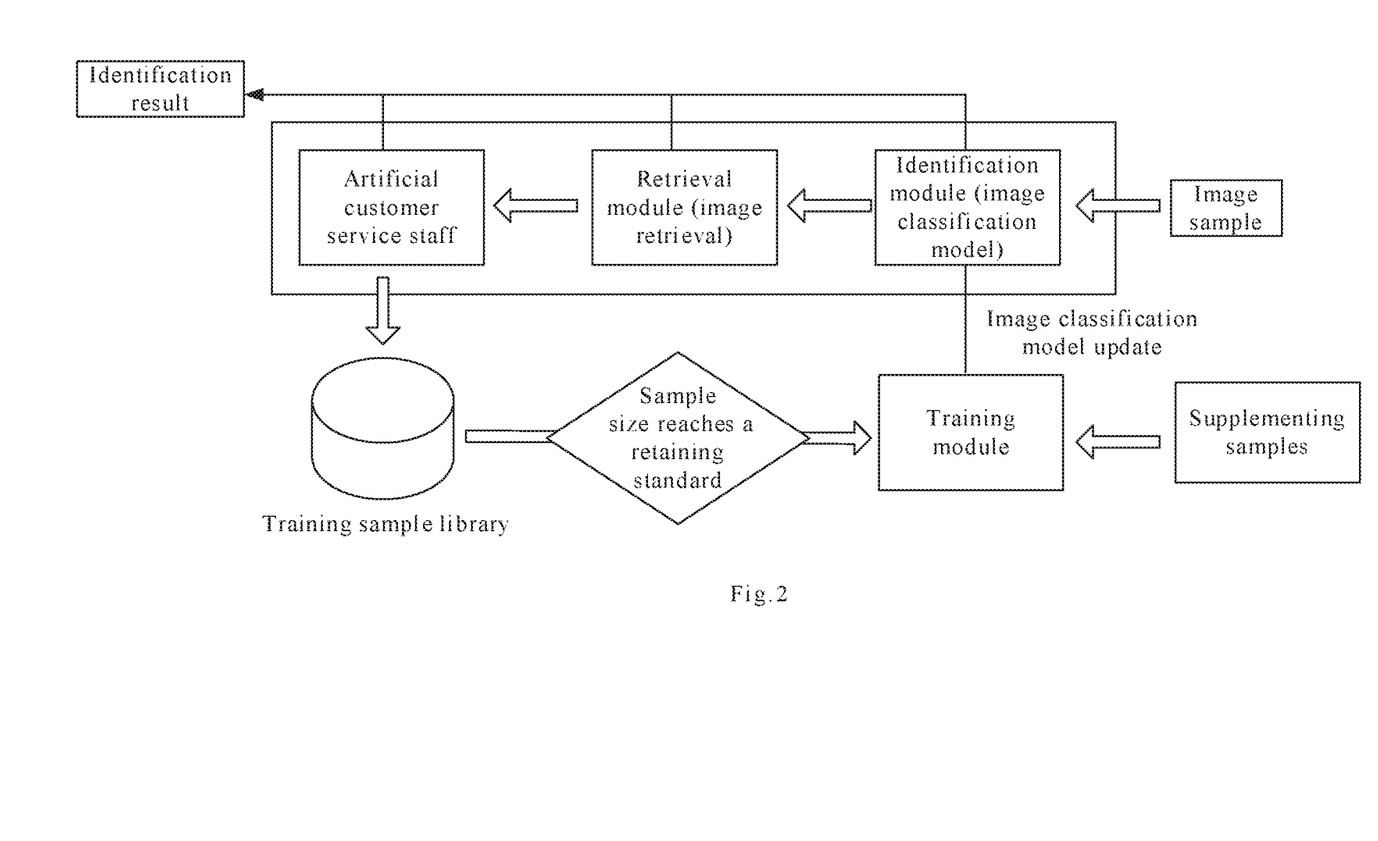
FIG. 2 is a system structure diagram of another image identification system provided by an embodiment of the present disclosure.

Exemplarily, referring to the block diagram of the image identification system shown in FIG. 2, if the image category confidence coefficient of the image sample identified by the identification module 11 is high, that is, the image category confidence coefficient of the image sample is greater than or equal to the predetermined threshold, then the identification result is directly output; and on the contrary, if the image category confidence coefficient of the image sample identified by the identification module 11 is low, that is, the image category confidence coefficient of the image sample is less than the predetermined threshold, then the system automatically turns to the retrieval module 12 and retrieves similar examples from the image sample library through the retrieval module 12. If one or more examples with high similarity is retrieved, the retrieval module analyzes these similar examples to obtain the example with the highest similarity to serve as a similar image of the image sample, and uses the identification result of the example as the identification result of the image sample. If the retrieval module 12 does not retrieve the example with the high similarity, the processing may be performed by an artificial customer service staff, and an artificial analysis result and the image data of the image sample are stored in the image sample library as a sample so as to act as a retrieval sample to supplement the retrieval samples in the image sample library.

Meanwhile, referring to the block diagram of the image identification system shown in FIG. 2, in order to improve the prediction ability of the image classification model, the retrieval module 12 generally stores the retrieved image retrieval example with the high confidence coefficient as a training sample in the training sample library to serve as the training sample of the image classification model, so as to train the image classification model to improve the identification ability and the identification accuracy of the image classification model.

For example, taking the blind assistant system as an example (for example, helping the blind to identify the traffic light), when an image containing traffic light information is obtained, firstly, the image is identified by using the image classification model, whether the image category confidence coefficient of the image reaches the identification threshold is determined. If the image category confidence coefficient of the image is low (for example, if the smog is severe, the degree of identification of the traffic light state information in the image is low), the image identification system automatically turns to the retrieval module 12 to retrieve a similar image similar with the image from the image sample library and feeds back the identification result of the similar image to the image identification system, and the image identification system may turn to the artificial customer service staff if the similar image cannot be retrieved, and the artificial customer service staff helps the blind. If the image category confidence coefficient of the image is high, the identification result identified based on the image classification model may be directly output. It should be noted that, when the sample of the artificial customer service staff is stored, the exact category of the object may not be directly obtained from the information of the artificial customer service staff, then necessary analysis processing is required, for example, taking the identification of the traffic light in the case of haze. If the artificial customer service staff guides the blind to cross the road, then the current traffic light should be a green light state, that is, the identification result is green light, and if the artificial customer service staff lets the blind to wait for crossing the road, then the current traffic light should be a non-green light state, that is, the identification result is non-green light.

In the above solution, by importing the image retrieval technology on the existing image identification technology, when the image category confidence coefficient of the image sample identified on the basis of the image classification model is less than the predetermined threshold, the similar artificial identification examples are directly retrieved for the image sample by using the image retrieval technology, the identification result of the target artificial identification example having the highest confidence coefficient among the similar artificial identification examples is used as the identification result of the image sample, and the retrieved image sample with the high confidence coefficient is stored in the training sample library to serve as the training sample for subsequent re-training of the image classification model based on these training samples. In this way, high-quality samples are accumulated through image identification and image retrieval, and the image classification model is retrained by image training, so that image identification, image retrieval and image training form a complete closed loop in the entire image identification system. With the continuous increase of the training samples and the continuous circulation of sample accumulation and re-training process, the identification ability of the image classification model and the identification accuracy of the identification module are iteratively improved.

On the other hand, with the continuous increase of the retrieved identification results, and the continuous increase of the training samples in the training sample library, the image classification model may also be retrained based on these preset samples in the present solution, so that the prediction ability of the image classification model is constantly improved.

Optionally, the training module 13 in the image identification system monitors the sample size of the training samples stored in the training sample library in real time, and performs retraining when it is determined that the sample size of the training samples meets a retaining standard.

Specifically, the training module 13 is specifically configured to:

judge whether the sample size of the training samples stored in the training sample library satisfies a second predetermined threshold; if yes, obtain the identification results of the training samples from the training sample library, and train the image classification model in the identification module 11.

Exemplarily, the automatic training update of the image classification model has certain starting conditions, for example, judging whether the sample size of preset samples with a known image category stored in the training sample library reaches the preset threshold, or checking whether the samples in a database reach the starting conditions of a model update when a new sample is stored in the library or periodically, if yes, the automatic training update comprises starting a machine learning model retraining process, and performing fine-tuning on the basis of the current model to generate a model with stronger prediction ability, and finally, updating the model to an online system.

In one embodiment of the above solution, preset annotation samples from the retrieval module stored in the training sample library are monitored, and when the training samples stored in the training sample library satisfy predetermined conditions, the existing image classification model is trained based on the identification results of the training samples, and the image classification is performed on the image sample through the trained image classification model. In this way, high-quality training samples better conforming to actual scenarios are obtained via the image retrieval technology so as to retrain the image classification model to train a model with higher identification accuracy, and the retained model may effectively improve the identification ability of the model to identify the image. Meanwhile, with the continuous increase of the training samples, the identification ability of the model is continuously improved, and the excessive investment of human resources is avoided.

The image identification method provided by the embodiment of the present disclosure will be described below based on the functional descriptions of the modules of the image identification system as shown in FIG. 1 and FIG. 2 and other related descriptions. With respect to the descriptions of technical terms, concepts and the like related to the above embodiment in the following embodiment, reference may be made to the above embodiment, and details are not described herein repeatedly.

Figure 3:
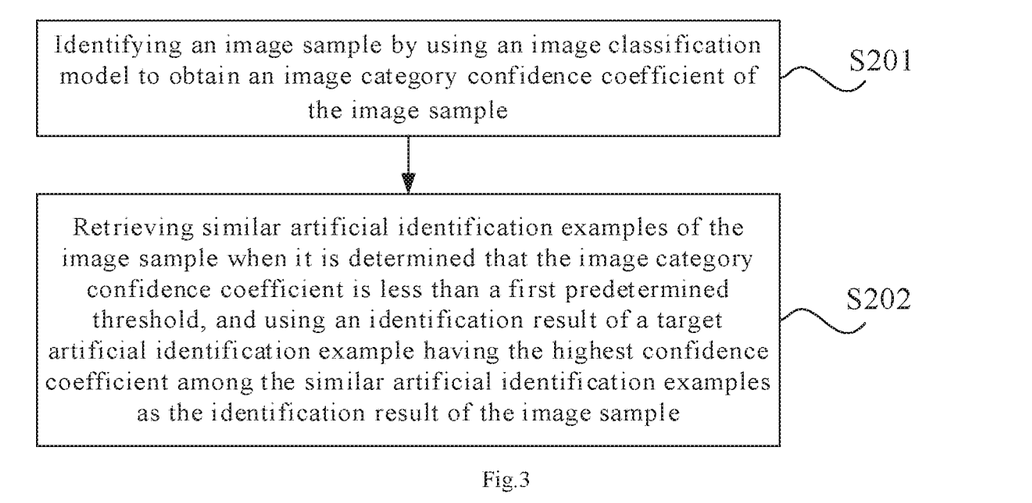
FIG. 3 is a method flowchart of an image identification method provided by an embodiment of the present disclosure.

The embodiment of the present disclosure provides an image identification method, applied to the image identification system described in the above embodiment. As shown in FIG. 3, the method includes the following acts:

S201. identifying an image sample by using an image classification model to obtain an image category confidence coefficient of the image sample.

S202. retrieving similar artificial identification examples of the image sample when it is determined that the image category confidence coefficient is less than a first predetermined threshold, and using an identification result of a target artificial identification example having the highest confidence coefficient among the similar artificial identification examples as the identification result of the image sample.

Then, the identified identification result of the image sample is output when it is determined that the image category confidence coefficient of the image sample is greater than or equal to the first predetermined threshold.

Optionally, when the step S201 is executed, the method further includes the following acts:

S201a, obtaining image features of the image sample after identifying the image sample by using the image classification model.

Further, based on the act S201a, the above act S202 specifically includes the following acts:

S202a. retrieving the similar artificial identification examples of the image sample from the image sample library according to the image features of the image sample; wherein the similarity between the image features included in the identification results of the similar artificial identification examples and the image features of the image sample is greater than a second predetermined threshold; and the image sample library is used for storing one or more artificial identification examples.

Optionally, after the act S202, the method further includes a training process of the image classification model, which specifically includes the following acts:

S203. storing the image sample in the training sample library as an image retrieval example with a high confidence coefficient when the image category confidence coefficient of the image sample is greater than or equal to the first predetermined threshold; wherein the training samples include the artificial identification example and the image retrieval example with the high confidence coefficient.

S204. training the image classification model according to training samples in a training sample library; wherein the training samples include the artificial identification example and the image retrieval example with the high confidence coefficient.

Figure 4:
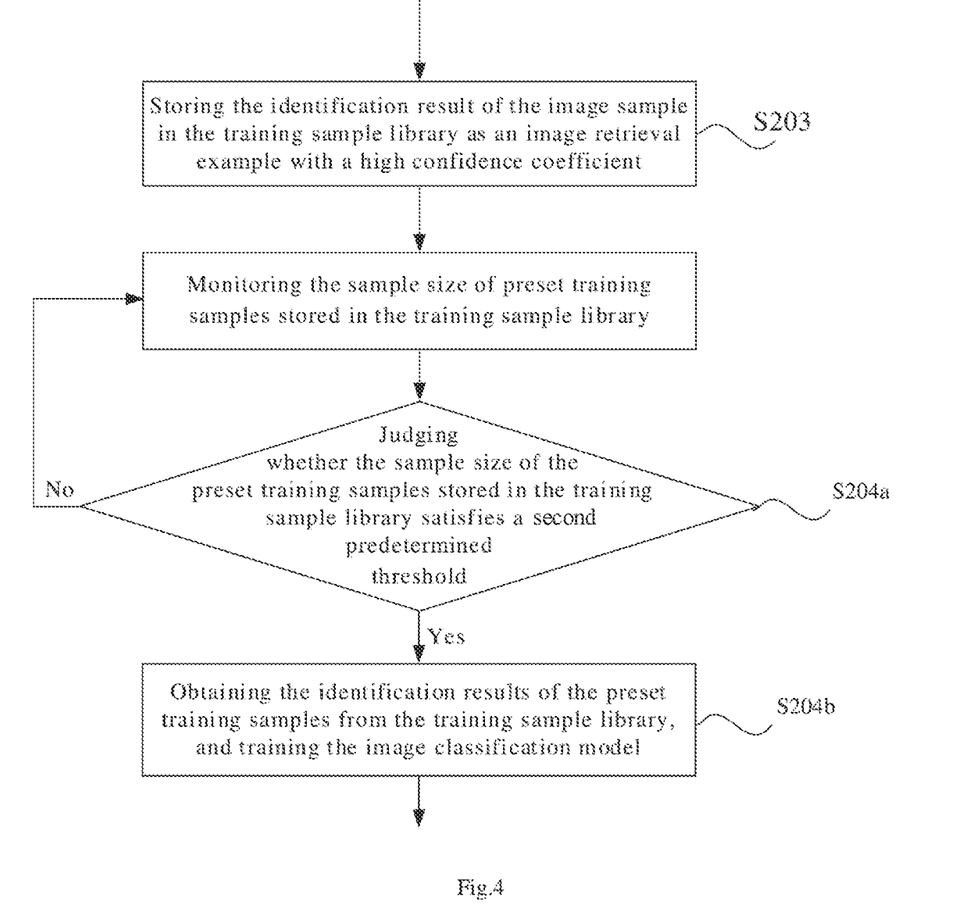
FIG. 4 is a schematic flow diagram of a training method of an image classification model provided by an embodiment of the present disclosure.

Optionally, as shown in FIG. 4, the act S204 specifically includes the following acts:

S204a. judging whether the sample size of the training samples stored in the training sample library satisfies a second predetermined threshold.

S204b. if yes, obtaining the identification results of the training samples from the training sample library, and training the image classification model.

The solution provided by the embodiment of the present disclosure is mainly introduced from the angle of the image identification system. It may be understood that, in order to implement the above functions, the system includes corresponding hardware structures and/or software modules for executing the various functions. Those skilled in the art will readily appreciate that the present disclosure may be implemented by hardware or a combination of hardware and computer software in combination with the units and algorithm acts of the various examples described in the embodiments disclosed herein. Whether a certain function is implemented in the form of hardware or driving the hardware via the computer software is determined by specific applications and design constraint conditions of the technical solutions.

Those skilled in the art may implement the described functions by using different methods for each specific application, but this implementation should not be considered beyond the scope of the present disclosure.

An apparatus embodiment corresponding to the method embodiment mentioned above and provided by the embodiment of the embodiment of the present disclosure is described below. It should be noted that the explanations of related contents in the following apparatus embodiment may refer to the above method embodiment.

The functions capable of being implemented by the modules in the system are as follows: the identification module 11 is configured to support the image identification system to execute the act S201 in FIG. 3; the retrieval module 12 is configured to support the image identification system to execute the act S202 in FIG. 3; and the training module 13 is configured to support the image identification system to execute the act S203 in FIG. 3. Further, the identification module 11 is configured to support the image identification system to execute the act S201a in above context, and the retrieval module 12 is specifically configured to support the image identification system to execute the acts S202a and S202b in the above context. Further, the retrieval module 12 is specifically configured to support the image identification system to execute the act S203 in the above context, and the training module 13 is configured to support the image identification system to execute the act S204 in in the above context. Furthermore, the training module 13 is configured to support the image identification system to execute the acts S204a and S204b in the above context. All related contents of the acts involved in the above method embodiment may be quoted to the function descriptions of the corresponding functional modules, and details are not described herein repeatedly.

The embodiment of the present disclosure may divide the function modules according to the functions of the modules of the image identification system in the above method example, for example, the function modules may be divided according to the functions, and two or more functions may also be integrated into one processing module. The above integrated module may be implemented in the form of hardware and may also be implemented in the form of a software function module. It should be noted that the division of the modules in the embodiment of the present disclosure is schematic and is only a logical function division, and other division manners may be provided during the actual implementation.

In hardware implementation, the above identification module 11, the retrieval module 12 and the training module 13 may be processors. Programs corresponding to the actions executed by the above modules may be stored in memories connected with the processors in the form of software, so that the processors may conveniently call and execute operations corresponding to the above modules.

Figure 5:
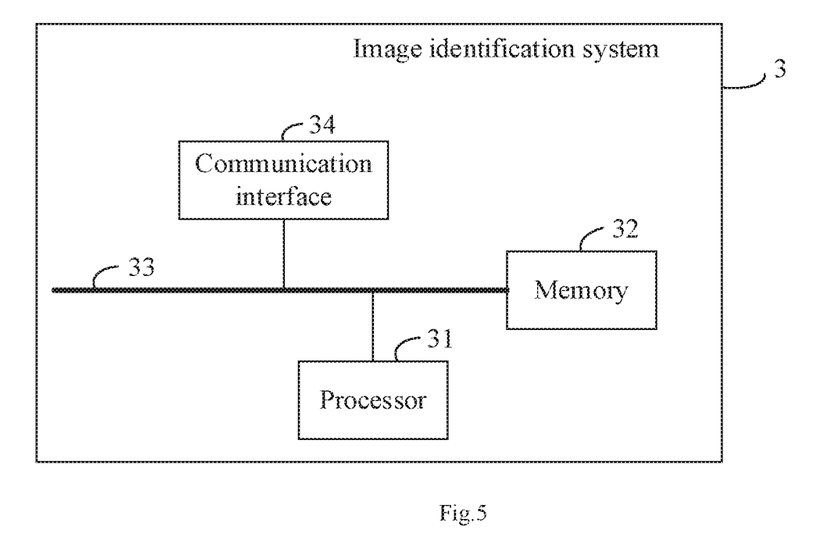
FIG. 5 is a system structure diagram of yet another image identification system provided by an embodiment of the present disclosure.

In the case of employing the integrated unit, FIG. 5 shows a possible structural schematic diagram of the image identification system involved in the above embodiment. The system 3 includes a processor 31, a memory 32, a system bus 33 and a communication interface 34. The memory 32 is configured to store a computer execution code, the processor 31 is connected with the memory 32 through the system bus 33, when the apparatus is running, the processor 31 is configured to execute the computer execution code stored in the memory 32 to execute any image identification method provided by the embodiment of the present disclosure, for example, the processor 31 is configured to support the apparatus to execute all acts in FIG. 3, and/or applied to processes of the technology described herein, and the specific image identification method may be referred to related descriptions mentioned above and in the drawings, and thus is not repeatedly described herein.

The embodiment of the disclosure further provides a storage medium, which may include the memory 32.

The embodiment of the disclosure further provides a computer program product, which may be directly loaded into the memory 32 and contains a software code, and the computer program may implement any one of the above image identification methods after being loaded and executed by the computer.

The processor 31 may be a processor or a collective name of a plurality of processing elements. For example, the processor 31 may be a central processing unit (CPU). The processor 31 may also be other general purpose processors, a digital signal processing (DSP), an application specific integrated circuit (ASIC), a field-programmable gate array (FPGA) or other programmable logic devices, discrete gates or transistor logic devices, discrete hardware components and the like, which may implement or execute logic boxes, modules, and circuits of various examples in combination with the contents disclosed by the present disclosure. For example, the general purpose processor may be a microprocessor or the processor may also be any conventional processor or the like. The processor 31 may also be a dedicated processor, and the dedicated processor may include at least one of a baseband processing chip, a radio frequency processing chip and the like. The processor may also be a combination for implementing a computing function, for example, including one or more microprocessor combinations, a combination of a DSP and a microprocessor, and the like. Further, the dedicated processor may also include a chip having other dedicated processing functions of the apparatus.

The acts of the method described in combination with the contents disclosed by the present disclosure may be implemented in the form of hardware and may also be implemented by a processor executing software instructions. The software instructions may be composed of corresponding software modules, and the software modules may be stored in a random access memory (abbreviation: RAM), a flash memory, a read only memory (abbreviation: ROM), an erasable programmable read-only memory (abbreviation: EPROM), an electrically erasable programmable read-only memory (abbreviation: EEPROM), a register, a hard disk, a mobile hard disk, a CD-ROM or any other form of storage medium known in the art. An exemplary storage medium is coupled to the processor, so that the processor may read information from and write information to the storage medium. Of course, the storage medium may also be a constituent part of the processor. The processor and the storage medium may be located in an ASIC. Additionally, the ASIC may be located in a terminal device. Of course, the processor and the storage medium may also exist as discrete components in the terminal device.

The system bus 33 may include a data bus, a power bus, a control bus and a signal state bus or the like. For the sake of clarity in the present embodiment, various buses are illustrated as the system bus 33 in FIG. 5.

A communication interface 34 may specifically be a transceiver on the apparatus. The transceiver may be a wireless transceiver. For example, the wireless transceiver may be an antenna or the like of the apparatus. The processor 31 communicates with other devices via the communication interface 34, for example, if the apparatus is a module or a component of the terminal device, the apparatus is configured to perform data interaction with other modules in the terminal device.

Figure 6:
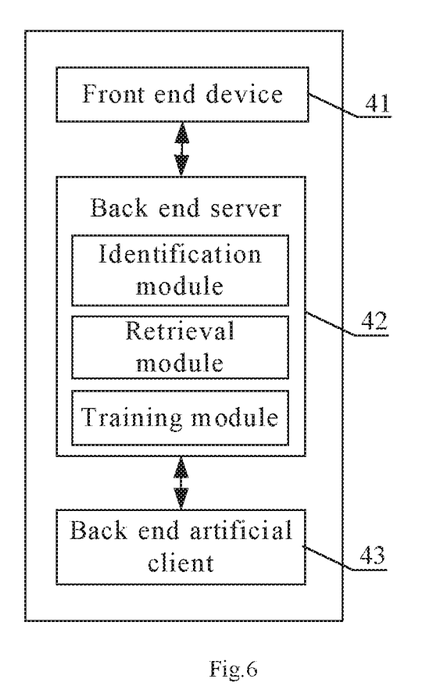
FIG. 6 is a system structure diagram of yet another image identification system provided by an embodiment of the present disclosure.

The embodiment of the present disclosure further provides an image identification system. As shown in FIG. 6, the image identification system includes: a front end device 41, a back end server 42 and a back end artificial client 43, wherein the front end device 41 is configured to collect an image sample; the back end server 42 is used to implement the image identification method provided by the present application, and the back end server includes an identification module, a retrieval module and a training module; and when the back end server 42 does not obtain an example with a high confidence coefficient or retrieve an example with high similarity, it transmits the image sample to the back end artificial client 43 to be processed by an artificial customer service staff. Exemplarily, the above front end device 41 may be an electronic device such as a mobile terminal and a blind guide intelligent robot with image collection functions; and the back end server 42 may be an image identification system provided by the present application, and may also be a server integrated with the image identification system provided by the present application.

Those skilled in the art should be aware that, in one or more examples described above, the functions described herein may be implemented by hardware, software, firmware, or any combination thereof. When implemented by the software, the functions may be stored in a computer readable medium or transmitted as one or more instructions or codes on the computer readable medium. The computer readable medium includes a computer storage medium and a communication medium, wherein the communication medium includes any medium that may conveniently transfer the computer program from one place to another. The storage medium may be any available medium that may be accessed by a general purpose or special purpose computer.

Finally, it should be noted that the objects, technical solutions and beneficial effects of the present disclosure have been further described in detail in the specific embodiments described above, it should be understood that the above descriptions are only the specific embodiment of the present disclosure, and are not intended to limit the protection scope of the present disclosure, and any modifications, equivalent replacements, improvements and the like, made based on the technical solutions of the present disclosure, should be included in the protection scope of the present disclosure.

The invention claimed is:

1. An image identification method, comprising:
    identifying an image sample by using an image classification model to obtain an image category confidence coefficient of the image sample;
    retrieving similar artificial identification examples of the image sample when it is determined that the image category confidence coefficient is less than a first predetermined threshold, and using an identification result of a target artificial identification example having a highest confidence coefficient among the similar artificial identification examples as the identification result of the image sample;
    obtaining image features of the image sample after identifying the image sample by using the image classification model; and
    retrieving similar artificial identification examples of the image sample for analysis to obtain the identification result of the image sample, wherein the retrieving for analysis to obtain the identification result of the image sample comprises:
        retrieving the similar artificial identification examples of the image sample from an image sample library according to the image features of the image sample obtained by an identification module, wherein a similarity between the image features contained in the identification results of the similar artificial identification examples and the image features of the image sample is greater than a second predetermined threshold, and wherein the image sample library is used for storing one or more artificial identification examples.

2. The method according to claim 1, wherein after using the identification result of the target artificial identification example having the highest confidence coefficient among the similar artificial identification examples as the identification result of the image sample, the method further comprises:
    storing the image sample in a training sample library of training samples as an image retrieval example with a high confidence coefficient when the image category confidence coefficient of the image sample is greater than or equal to the first predetermined threshold;
    wherein the training samples comprise an artificial identification example and the image retrieval example with the high confidence coefficient.

3. The method according to claim 2, further comprising:
    training the image classification model by using training samples in the training sample library, wherein the training samples comprise the artificial identification example and the image retrieval example with the high confidence coefficient.

4. The method according to claim 3, further comprising:
    judging whether a sample size of the training samples stored in the training sample library satisfies a second predetermined threshold; and
    if yes, obtaining the identification results of the training samples from the training sample library, and training the image classification model in the identification module based thereon.

5. The method according to claim 1, wherein after identifying the image sample by using the image classification model to obtain the identification result, the method further comprises:
    outputting the identified identification result of the image sample when it is determined that the image category confidence coefficient of the image sample is greater than or equal to the first predetermined threshold.

6. An image identification system, wherein the system comprises:
    a memory; and
    a processor,
    wherein the memory is configured to store a computer execution code,
    wherein the processor, upon execution of the computer execution code, is configured to:
        identify an image sample by using an image classification model to obtain an image category confidence coefficient of the image sample;
        retrieve similar artificial identification examples of the image sample it is determined that the image category confidence coefficient is less than a first predetermined threshold, and using an identification result of a target artificial identification example having a highest confidence coefficient among the similar artificial identification examples as the identification result of the image sample;

obtaining image features of the image sample after identifying the image sample by using the image classification model; and retrieving similar artificial identification examples of the image sample for analysis to obtain the identification result of the image sample, wherein the retrieving for analysis to obtain the identification result of the image sample comprises:

retrieving the similar artificial identification examples of the image sample from an image sample library according to the image features of the image sample obtained by an identification module, wherein a similarity between the image features contained in the identification results of the similar artificial identification examples and the image features of the image sample is greater than a second predetermined threshold, and wherein the image sample library is used for storing one or more artificial identification examples.

7. A non-transitory computer storage medium configured to store computer software instructions used by an image identification system comprising a memory and a processor, wherein the computer software instructions, upon execution by the processor, results in the processor being configured to:

identify an image sample by using an image classification model to obtain an image category confidence coefficient of the image sample; and retrieve similar artificial identification examples of the image sample it is determined that the image category confidence coefficient is less than a first predetermined threshold, and using an identification result of a target artificial identification example having a highest confidence coefficient among the similar artificial identification examples as the identification result of the image sample;

obtaining image features of the image sample after identifying the image sample by using the image classification model; and retrieving similar artificial identification examples of the image sample for analysis to obtain the identification result of the image sample, wherein the retrieving for analysis to obtain the identification result of the image sample comprises:

retrieving the similar artificial identification examples of the image sample from an image sample library according to the image features of the image sample obtained by an identification module, wherein a similarity between the image features contained in the identification results of the similar artificial identification examples and the image features of the image sample is greater than a second predetermined threshold, and wherein the image sample library is used for storing one or more artificial identification examples.

* * * * *